(12) United States Patent
Nishikawa et al.

(10) Patent No.: US 9,382,074 B2
(45) Date of Patent: Jul. 5, 2016

(54) SCREW DRIVE CONVEYING APPARATUS

(71) Applicants: Hiroshi Nishikawa, Shiga (JP); Toshiyuki Iba, Shiga (JP)

(72) Inventors: Hiroshi Nishikawa, Shiga (JP); Toshiyuki Iba, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 14/752,349

(22) Filed: Jun. 26, 2015

(65) Prior Publication Data

US 2015/0291364 A1 Oct. 15, 2015

Related U.S. Application Data

(63) Continuation of application No. PCT/JP2013/076002, filed on Sep. 26, 2013.

(30) Foreign Application Priority Data

Dec. 27, 2012 (JP) ................................ 2012-285622

(51) Int. Cl.
*B65G 13/12* (2006.01)
*B65G 33/04* (2006.01)
*B65G 33/00* (2006.01)
*B65G 35/06* (2006.01)
*B61B 13/12* (2006.01)

(52) U.S. Cl.
CPC .............. *B65G 35/066* (2013.01); *B61B 13/12* (2013.01)

(58) Field of Classification Search
None
See application file for complete search history.

(56) References Cited

U.S. PATENT DOCUMENTS

| 8,272,500 | B2 * | 9/2012 | Nishikawa | B65G 35/066 |
| | | | | 198/465.1 |
| 8,602,203 | B2 * | 12/2013 | Nishihara | B65G 35/066 |
| | | | | 104/172.3 |

FOREIGN PATENT DOCUMENTS

JP 2011195261 A 10/2011

* cited by examiner

*Primary Examiner* — Kavel Singh
(74) *Attorney, Agent, or Firm* — St. Onge Steward Johnston & Reens LLC

(57) ABSTRACT

A screw-drive conveying apparatus has on a conveying traveling body side, a first driven roller pair having a shorter distance between two driven front and rear rollers and a second driven roller pair having a longer distance between two driven front and rear rollers. A first screw shaft row with which the respective driven rollers of the first driven roller pair are engaged and a second screw shaft row with which the respective driven rollers of the second driven roller pair are engaged are provided on a traveling path side. The length of screw discontinued spaces between both screw shaft rows is equal to the distance between the driven rollers of the driven roller pair engaged with the screw shaft row on the upstream side.

7 Claims, 9 Drawing Sheets

US 9,382,074 B2

SCREW DRIVE CONVEYING APPARATUS

FIELD OF THE INVENTION

The present invention relates to a screw-drive conveying apparatus configured such that driven rollers on a conveying traveling body side are engaged with screw shafts provided along a traveling path to propel the conveying traveling body at a predetermined speed by rotation drive of the screw shafts.

BACKGROUND OF THE INVENTION

A known screw-drive conveying apparatus has a screw shaft row composed of a plurality of screw shafts concentrically arranged in a line and interlockingly rotating at a constant speed with respect to each other is provided along the traveling path of the conveying traveling body, and two driven front and rear rollers engaged with the screw shafts are provided to the conveying traveling body with a distance corresponding to the length of a screw discontinued space between the screw shafts, as described in Patent Document 1. In the screw-drive conveying apparatus of such configuration, a plurality of screw shafts having an easily manufactured length can be concentrically supported individually by bearings to construct a long screw shaft row, while the conveying traveling body can be continuously driven and travel irrespective of the existence of the screw discontinued space between the screw shafts.

Patent Document 1: Japanese unexamined patent application publication No. 2011-195261

SUMMARY OF THE INVENTION

In a conveying apparatus that engages the driven rollers on the conveying traveling body side with the screw shafts rotationally driven at fixed positions to drive and make the conveying traveling body travel at a speed corresponding to a spiral pitch of the screw shafts, the drive travel speed of the conveying traveling body can be changed by changing the spiral pitch of the screw shafts. In the configuration that arranges the two driven front and rear rollers with the distance corresponding to the length of the screw discontinued space between the screw shafts as the driven rollers as described above, however, the spiral pitch of the screw shafts needs to be an integer fraction at the distance between the two driven front and rear rollers and cannot be changed freely. In practice, about two to three types of areas can only be constructed as areas different in the drive travel speed of the conveying traveling body (the spiral pitch) in a conveying apparatus that uses such a large conveying traveling body that conveys an automobile vehicle body.

The present invention proposes a screw-drive conveying apparatus capable of solving the conventional problems as above. Described by giving reference symbols in parentheses used in the description of an embodiment described later in order to facilitate understanding the relationship with the embodiment, a screw-drive conveying apparatus according to the present invention is the one in which a screw shaft row (13) composed of a plurality of screw shafts (22a to 22c) concentrically arranged in a line and interlockingly rotating at a constant speed with respect to each other is provided along a traveling path of a conveying traveling body (1), and two driven front and rear rollers (7a, 7b) engaged with the screw shafts (22a to 22c) are provided to the conveying traveling body (1) with a distance corresponding to the length of a screw discontinued space between the screw shafts (22a to 22c), characterized in that as the two driven front and rear rollers, at least two pairs of a first driven roller pair (8) having a shorter distance (D1) between the two driven front and rear rollers (7a, 7b) and a second driven roller pair (10) having a longer distance (D2) between the two driven front and rear rollers (9a, 9b) are provided, displaced in a direction orthogonal to a traveling direction of the conveying traveling body, and as the screw shaft row, a first screw shaft row (13) with which the respective driven rollers (7a, 7b) of the first driven roller pair (8) are engaged and a second screw shaft row (14) with which the respective driven rollers (9a, 9b) of the second driven roller pair (10) are engaged are provided alternately along the traveling path of the conveying traveling body (1), and respective screw shafts (22a to 22c) of the first screw shaft row (13) and respective screw shafts (26a, 26b) of the second screw shaft row (14) are interlockingly connected at a constant speed with respect to each other, and the length (L1, L2) of screw discontinued spaces between the first and second screw shaft rows (13, 14) in the traveling direction of the conveying traveling body is equal to the distance (D1/D2) between the driven rollers (7a, 7b/9a, 9b) of the driven roller pair (8/10) engaged with the screw shaft row (13/14) on the upstream side.

With the above configuration of the present invention, the feeding speed of the conveying traveling body in the first screw shaft row and the feeding speed of the conveying traveling body in the second screw shaft row can be changed to a minimum by setting the spiral pitch of the screw shafts constituting the first screw shaft row in a condition of an integer fraction at the distance D1 between the two driven front and rear rollers of the first driven roller pair and by setting the spiral pitch of the screw shafts constituting the second screw shaft row in a condition of an integer fraction at the distance D2 between the two driven front and rear rollers of the second driven roller pair. In practice, however, a plurality of areas different in the spiral pitch (the feeding speed) can be constructed in one screw shaft row in a condition of an integer fraction at the distance between the two driven front and rear rollers engaged with this screw shaft row, as conventionally known. Where at least either one of the first and second screw shaft rows is constructed as above, an area different in the feeding speed which can be constructed of the other screw shaft row can be added and thus the number of areas different in the feeding speed settable in the traveling path on which the conveying traveling body travels can be increased within reason in the entire conveying apparatus. It is a matter of course that a plurality of areas different in the feeding speed are set in both of the first and second screw shaft rows, whereby a considerable number of areas different in the feeding speed can be set in the entire conveying apparatus. That is, the conveying apparatus of the present invention can be utilized effectively when a plurality of predetermined tasks are carried out with respect to a workpiece loaded on a conveying traveling body and conveyed on a constant traveling path, while the workpiece is conveyed at various conveying speeds suitable for respective tasks.

In carrying out the conveying apparatus according to the present invention, it is also possible to arrange the first and second screw shaft rows (13, 14) at a lateral side or upper side of the traveling path of the conveying traveling body (1) depending on a support and guide structure of the conveying traveling body. However, it is preferable in the case of the carriage-type conveying traveling body (1) traveling on the guide rails (3a, 3b) laid on the floor surface that the first and second screw shaft rows (13, 14) are arranged bilaterally symmetrically with respect to a middle position in the width direction of the conveying traveling body (1) within a space below the conveying traveling body (1).

The plurality of concentric in-line screw shafts (22a to 22c, 26a, 26b) constituting the respective first and second screw shaft rows (13, 14) can be interlockingly connected together by a single transmission shaft (20, 24) having universal joints (19a, 19b, 23a, 23b) at both ends. When the screw shaft at the end portion of the first screw shaft row (13) and the screw shaft at the end portion of the second screw shaft row (14) are configured to be interlockingly connected to each other by a transmission means (27) consisting of a single obliquely arranged transmission shaft (29) having universal joints (28a, 28b) at both ends, the conveying apparatus on the whole can be implemented inexpensively by using a transmission means similar to that for interlockingly connecting the former plurality of concentric in-line screw shafts. In other words, the distance between the two driven front and rear rollers constituting the first and second driven roller pairs is preferably increased in order to allow for use of the transmission means using such obliquely arranged transmission shaft. Further, the headmost driven roller (7a) of the first driven roller pair (8) and the headmost driven roller (9a) of the second driven roller pair (10) are preferably arranged in parallel in a direction orthogonal to the traveling direction of the conveying traveling body (1).

Each driven roller (7a, 7b, 9a, 9b) can be pivotally supported to a movable body (36) supported to the conveying traveling body (1) by two movable shaft bodies (35a, 35b) arranged in a line in the traveling direction of the conveying traveling body (1) and being capable of reciprocating perpendicularly to the engaging screw shaft (22a to 22c, 26a, 26b), and a locking means (44) to lock the two movable shaft bodies (35a, 35b) in an active position that the driven roller is engaged with the screw shaft and in an inactive position that the driven roller is disengaged from the screw shaft can be provided. With this configuration, when the necessity to separate and move the conveying traveling body from the screw shaft arises, the locking action by the locking means is released to switch the driven roller in the active position to the inactive position, and thereafter, the driven roller in the inactive position is locked by the locking means. By this, the conveying traveling body can be separated from the screw shaft and moved safely and easily. Under circumstances where only either one of the two driven front and rear rollers receives thrust from the screw shaft such as a time of transfer of the driven roller between the screw shafts, the enormous thrust which this driven roller receives can be borne by the two in-line movable shaft bodies, and the conveying traveling body can be screw-driven strongly without causing problems in terms of strength even in a conveying apparatus for conveying a large and heavy workpiece.

In the case of supporting the driven roller (7a, 7b, 9a, 9b) as above, the locking means (44) can be composed of rotary tables (37a, 37b) respectively supported to end portions of the movable shaft bodies (35a, 35b) so as to be rotatable about the movable shaft bodies (35a, 35b), handles (38a, 38b) for rotationally operating the rotary tables (37a, 37b), a fixed plate (40) arranged on the conveying traveling body (1) side so as to adjoin the rotary tables (37a, 37b) and provided with engaged portions (41a to 43b), and engaging portions (39a, 39b) provided around the rotary tables (37a, 37b), and the engaging portions (39a, 39b) can be configured to be engaged and disengaged with respect to the engaged portions (41a to 43b) by rotation of the rotary tables (37a, 37b) when the driven roller (7a, 7b, 9a, 9b) is in the active position and the inactive position. With the thus configured locking means, the structure is simple and can be implemented inexpensively, while the driven roller can easily be switched to the active position and the inactive position. When this configuration is employed, respective rotary tables at the end portions of the two movable shaft bodies are preferably configured to be simultaneously rotationally operated by the handles respectively provided. Further, as the inactive position of the driven roller, a first inactive position that the driven roller is simply disengaged from the screw shaft and a second inactive position that the driven roller is largely apart from the screw shaft to such an extent that the whole or part of the driven roller is drawn inside the conveying traveling body can be provided.

The foregoing configuration, that is, the configuration that the driven roller is pivotally supported to the movable body supported to the conveying traveling body by the two movable shaft bodies arranged in a line in the traveling direction of the conveying traveling body and being capable of reciprocating perpendicularly to the engaging screw shaft, or the configuration of the locking means has no relationship to the configuration of the present invention that the first screw shaft row and the first driven roller pair, and the second screw shaft row and the second driven roller pair are used properly depending on area, and can also be utilized in the conventional configuration, that is, the screw-drive conveying apparatus in which the screw shaft row composed of a plurality of screw shafts concentrically arranged in a line and interlockingly rotating at a constant speed with respect to each other is provided along the traveling path of the conveying traveling body, and the two driven front and rear rollers engaged with the screw shafts are provided to the conveying traveling body with a distance corresponding to the length of the screw discontinued space between the screw shafts.

DETAILED DESCRIPTION OF THE INVENTION

Figure 1:
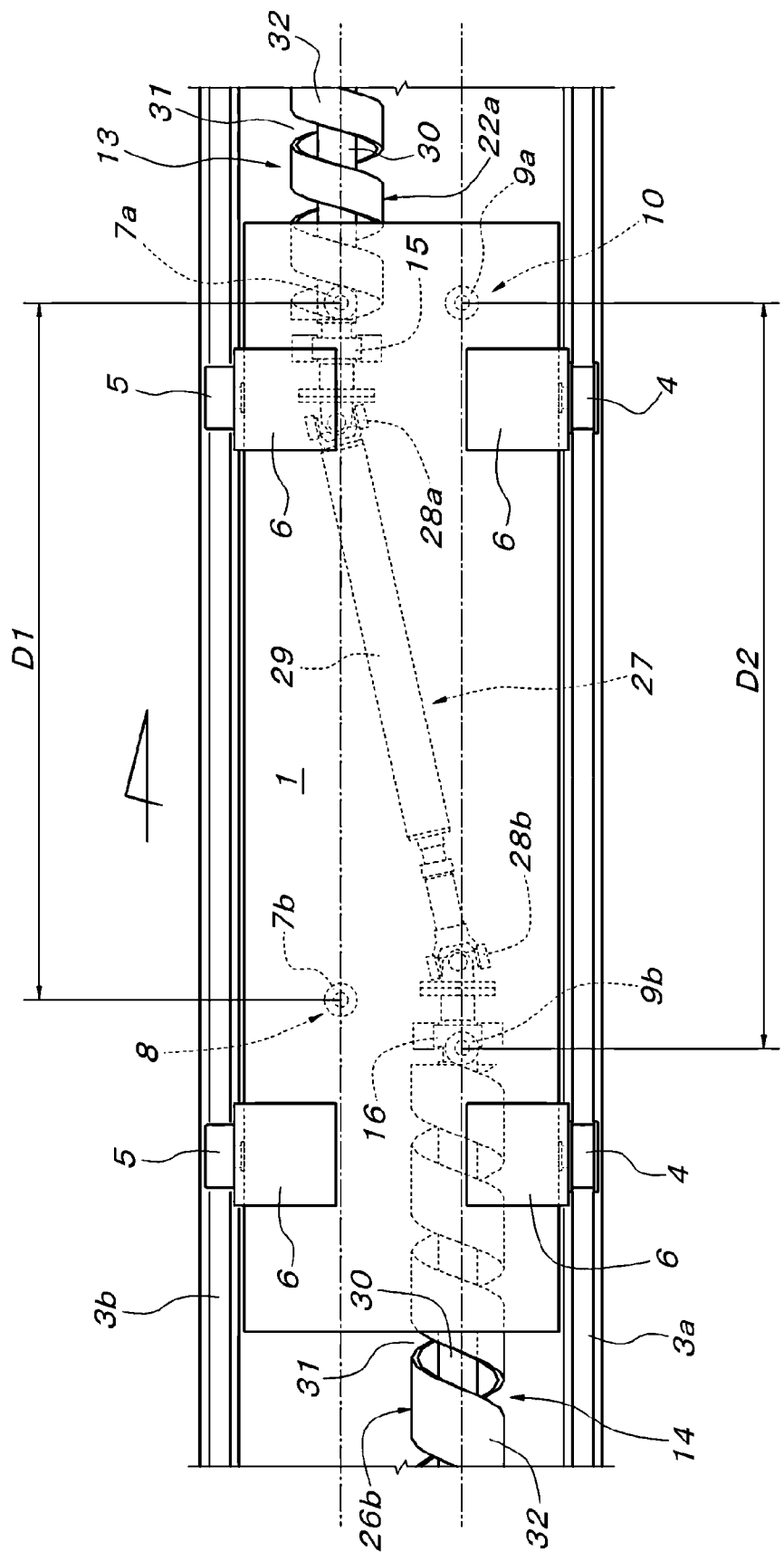
FIG. 1 is a plan view showing a conveying traveling body on a traveling path.
Figure 2:
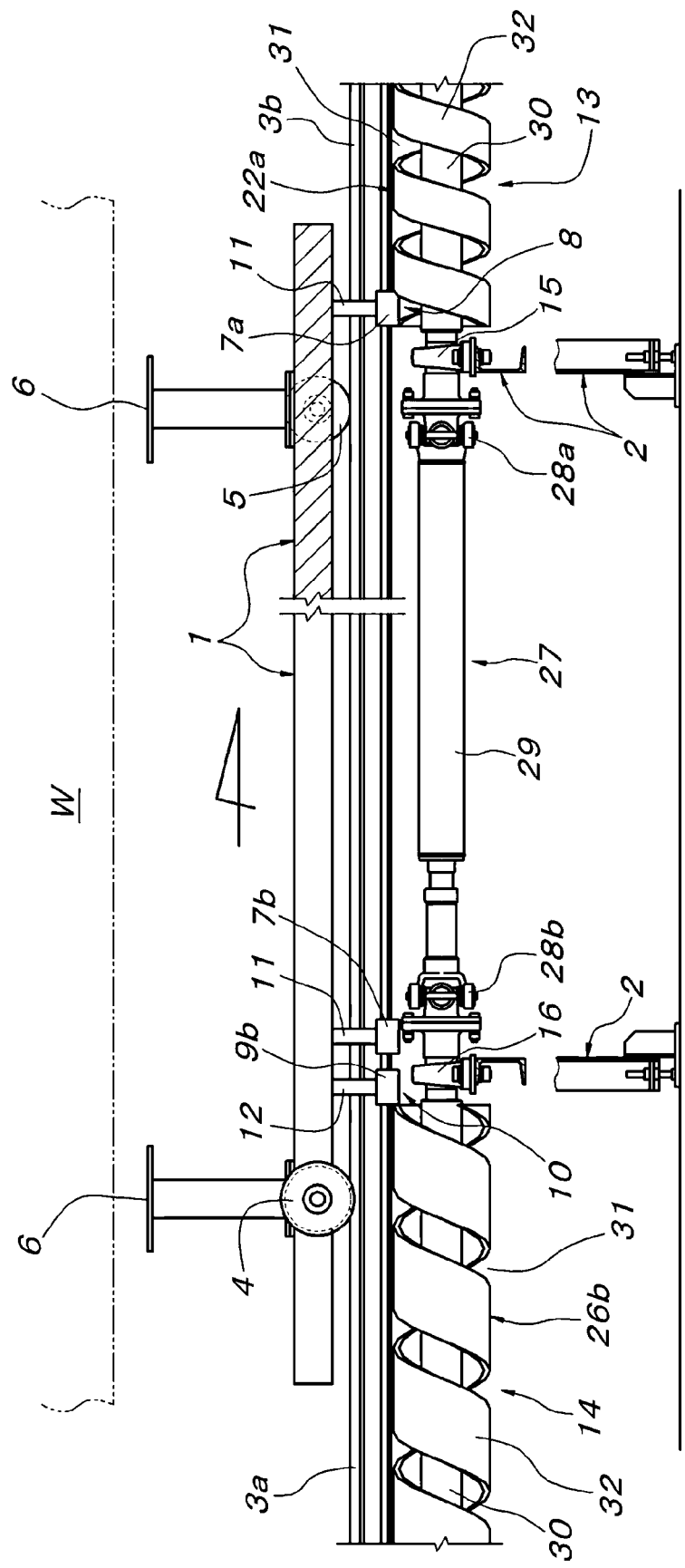
FIG. 2 is a partial longitudinal sectional side view of FIG. 1.

Hereinafter, a preferred embodiment of the present invention will be described based on the accompanying drawings. In FIGS. 1 to 3, a carriage-type conveying traveling body 1 includes a pair of front and rear flanged wheels 4 fitted and supported to one guide rail 3a of a pair of left and right guide rails 3a, 3b laid at a predetermined height from a floor surface by frames 2 mounted on the floor surface and a pair of front and rear flangeless wheels 5 supported to the other guide rail 3b. The conveying traveling body 1 is provided at the upper side thereof with workpiece support bases 6 for supporting a workpiece W. The conveying traveling body 1 has a bottom portion provided with a first driven roller pair 8 composed of two driven front and rear rollers 7a, 7b and a second driven roller pair 10 composed of two driven front and rear rollers 9a, 9b.

The first driven roller pair 8 and the second driven roller pair 10 are arranged bilaterally symmetrically with respect to a center position in the width direction of the conveying traveling body 1, and the driven rollers 7a, 9a at the foremost in the traveling direction are arranged in parallel at the same position relative to the traveling direction as shown in FIG. 1. A distance D1 between the two driven front and rear rollers 7a, 7b of the first driven roller pair 8 is slightly shorter than a distance D2 between the two driven front and rear rollers 9a, 9b of the second driven roller pair 10. The driven rollers 7a, 7b, 9a, 9b of these first driven roller pair 8 and second driven roller pair 10 are all pivotally supported to lower ends of vertical shaft bodies 11, 12 protruded downward from the bottom portion of the conveying traveling body 1, so as to be rotatable about vertical support shafts.

On a traveling path side of the conveying traveling body 1 of the above configuration, a first screw shaft row 13 with which the driven rollers 7a, 7b of the first driven roller pair 8 are engaged, and a second screw shaft row 14 with which the driven rollers 9a, 9b of the second driven roller pair 10 are engaged are provided. Both first and second screw shaft rows 13, 14 are pivotally supported by bearings 15, 16 to the frames 2 supporting the guide rails 3a, 3b. For example, when the traveling path of the conveying traveling body 1 is used as a coating line for the workpiece W, a pair of left and right both-side fixed covers 17 for covering respective rolling paths of the wheels 4, 5 of the conveying traveling body 1 and the guide rails 3a, 3b, and tunnel-like covers 18 for covering the respective screw shaft rows 13, 14 can be attached to the frames 2 in order to prevent adverse effects caused by receiving splashes of paint, as shown in FIG. 3. The upper side of the tunnel-like cover 18 is closed by a pair of left and right obliquely upward cover plates 18a, 18b composed of flexible, for example, rubber plates and having distal end portions abutting against each other. The vertical shaft bodies 11, 12 having the lower ends pivotally supporting the driven rollers 7a, 7b, 9a, 9b engaged with the respective screw shaft rows 13, 14 are configured to be able to pass and move through in such a manner so as to push through between the pair of left and right obliquely upward cover plates 18a, 18b. This pair of left and right obliquely upward cover plates 18a, 18b is preferably provided at a plurality of vertical stages (two stages in the shown example) as shown in FIG. 3B to prevent each screw shaft row 13, 14 and the driven rollers 7a, 7b, 9a, 9b engaged therewith from being further caught by splashes of paint.

Figure 4:
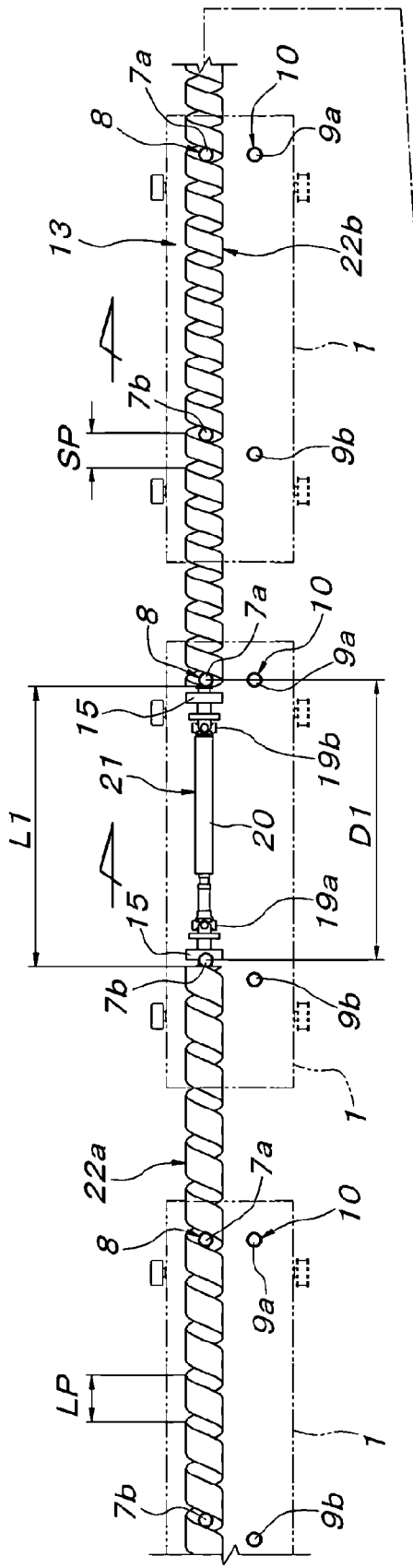
FIG. 4 is a schematic plan view explaining the driving state of the conveying traveling body in the first screw shaft row.
Figure 4:
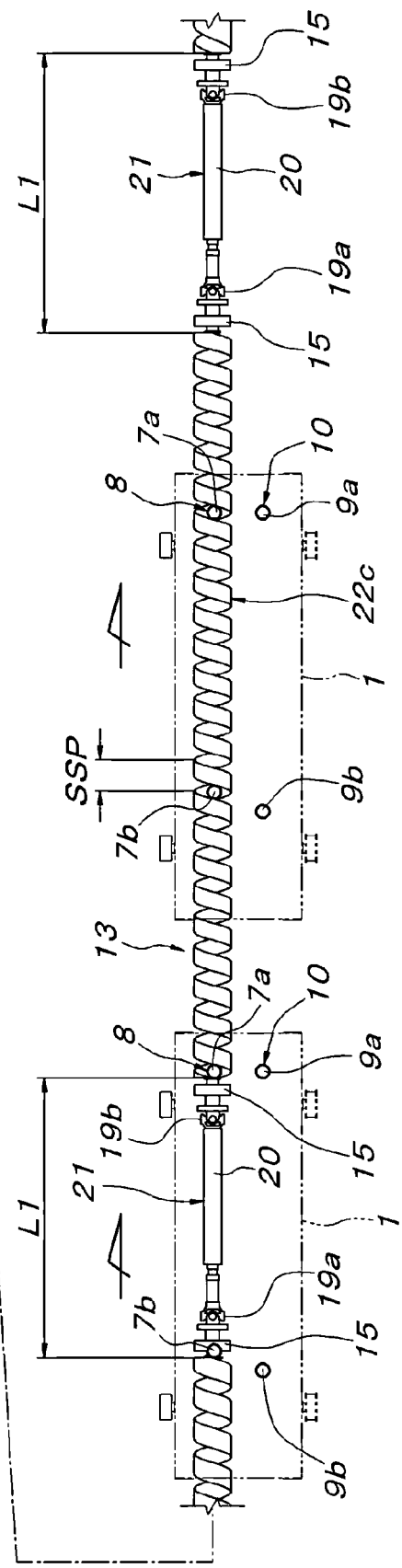

As shown in FIG. 4, the first screw shaft row 13 is composed of a plurality of screw shafts 22a to 22c having both ends supported by the bearings 15, interlockingly connected to each other by a transmission means 21 composed of a transmission shaft 20 having universal joints 19a, 19b at both ends, and concentrically arranged in a line. A screw discontinued space is formed between the respective screw shafts 22a to 22c due to the presence of the bearings 15 and transmission means 21. The length L1 of this screw discontinued space is equal to the distance D1 between the two driven front and rear rollers 7a, 7b of the first driven roller pair 8. The spiral pitch of each screw shaft 22a to 22c is set in a condition of becoming an integer fraction at the distance D1 between the two driven front and rear rollers 7a, 7b of the first driven roller pair 8. In this shown embodiment, the screw shaft 22a having a spiral pitch LP of one-sixth of the distance D1 (for example, 240 mm), the screw shaft 22b having a spiral pitch SP of one-seventh of the distance D1 (for example, 180 mm), and the screw shaft 22c having a spiral pitch SSP of one-eighth of the distance D1 (for example, 160 mm) are combined to construct the first screw shaft row 13.

Figure 5:
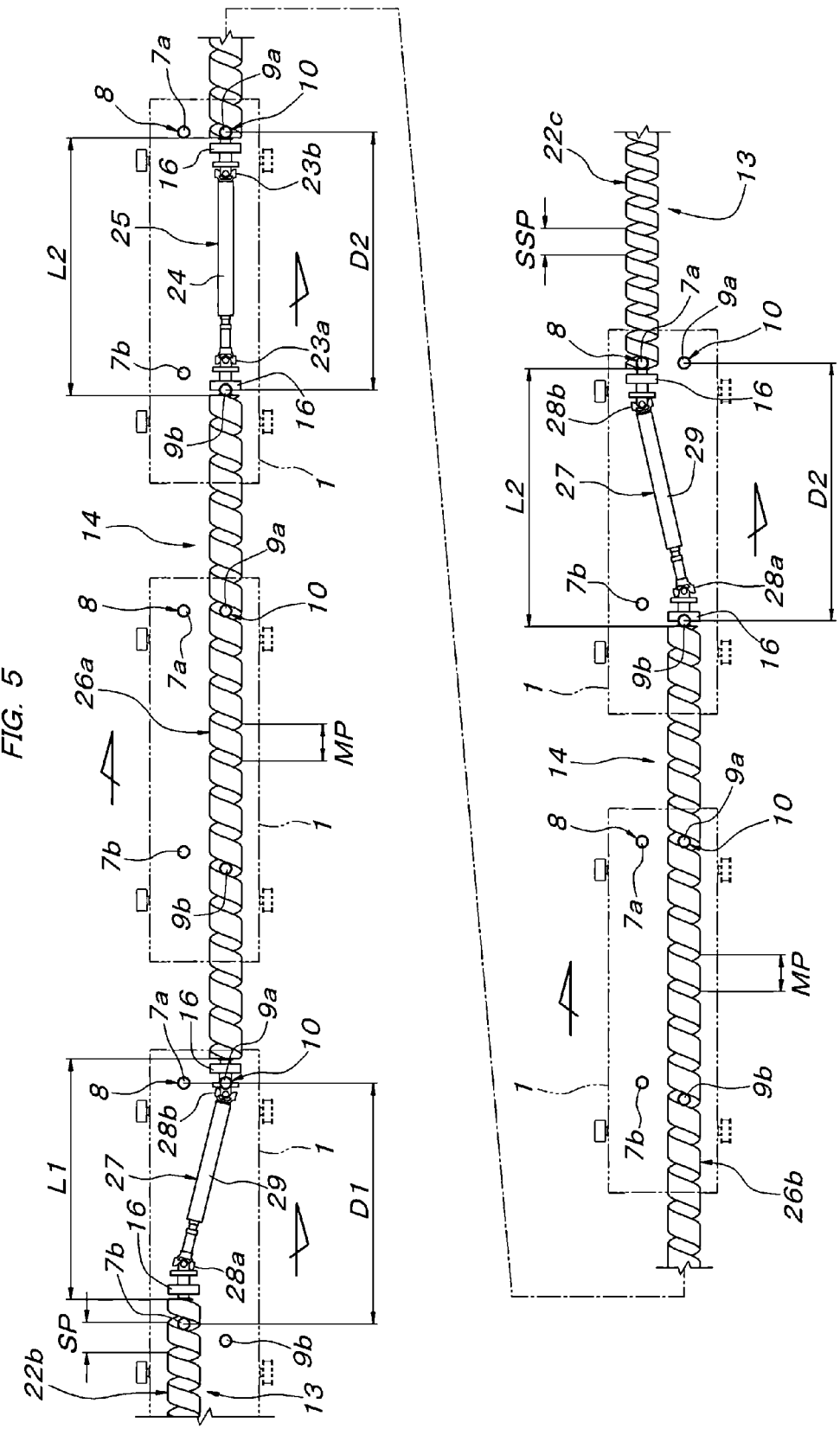
FIG. 5 is a schematic plan view explaining the driving state of the conveying traveling body between the first and second screw shaft rows and in the second screw shaft row.

The second screw shaft row 14 in this embodiment is composed of two screw shafts 26a, 26b having both ends supported by the bearings 16, interlockingly connected to each other by a transmission means 25 composed of a transmission shaft 24 having universal joints 23a, 23b at both ends, and concentrically arranged in a line, as shown in FIG. 5. The spiral pitch of the screw shafts 26a, 26b is set in a condition of becoming an integer fraction at the distance D2 between the two driven front and rear rollers 9a, 9b of the second driven roller pair 10. In this shown embodiment, a screw shaft having a spiral pitch MP of one-seventh of the distance D2 (for example, 220 mm) is employed for both of the two screw shafts 26a, 26b. However, this second screw shaft row 14 can be composed of a plurality of screw shafts having different spiral pitches similar to the first screw shaft row 13, and also can be composed of a single screw shaft having a specific spiral pitch depending on the circumstances. When the second screw shaft row 14 is composed of a plurality of screw shafts, the length L2 of the screw discontinued space between the screw shafts which is formed by the transmission means 25 and the bearings 16 is designed to be equal to the distance D2 between the two driven front and rear rollers 9a, 9b of the second driven roller pair 10 engaged with the second screw shaft row 14.

The foregoing first and second screw shaft rows 13, 14 are interlockingly connected to each other while arranged alternately in the traveling direction of the conveying traveling body 1, as shown in FIG. 5. A transmission means 27 between the first and second screw shaft rows 13, 14 at this time is composed of an oblique transmission shaft 29 having universal joints 28a, 28b at both ends. By this transmission means 27, the screw shaft 22a to 22c at the end of the first screw shaft row 13 and the screw shaft 26a, 26b at the end of the second screw shaft row 14 are interlockingly connected. A screw discontinued space is also formed in a place where this transmission means 27 is arranged. Of the screw discontinued spaces, the screw discontinued space in which the first screw shaft row 13 is located upstream is designed to have the same length L1 as the distance D1 between the two driven front and rear rollers 7a, 7b of the first driven roller pair 8 engaged with the first screw shaft row 13, and the screw discontinued space in which the second screw shaft row 14 is located upstream is designed to have the same length as the distance D2 between the two driven front and rear rollers 9a, 9b of the second driven roller pair 10 engaged with the second screw shaft row 14.

Figure 3A:
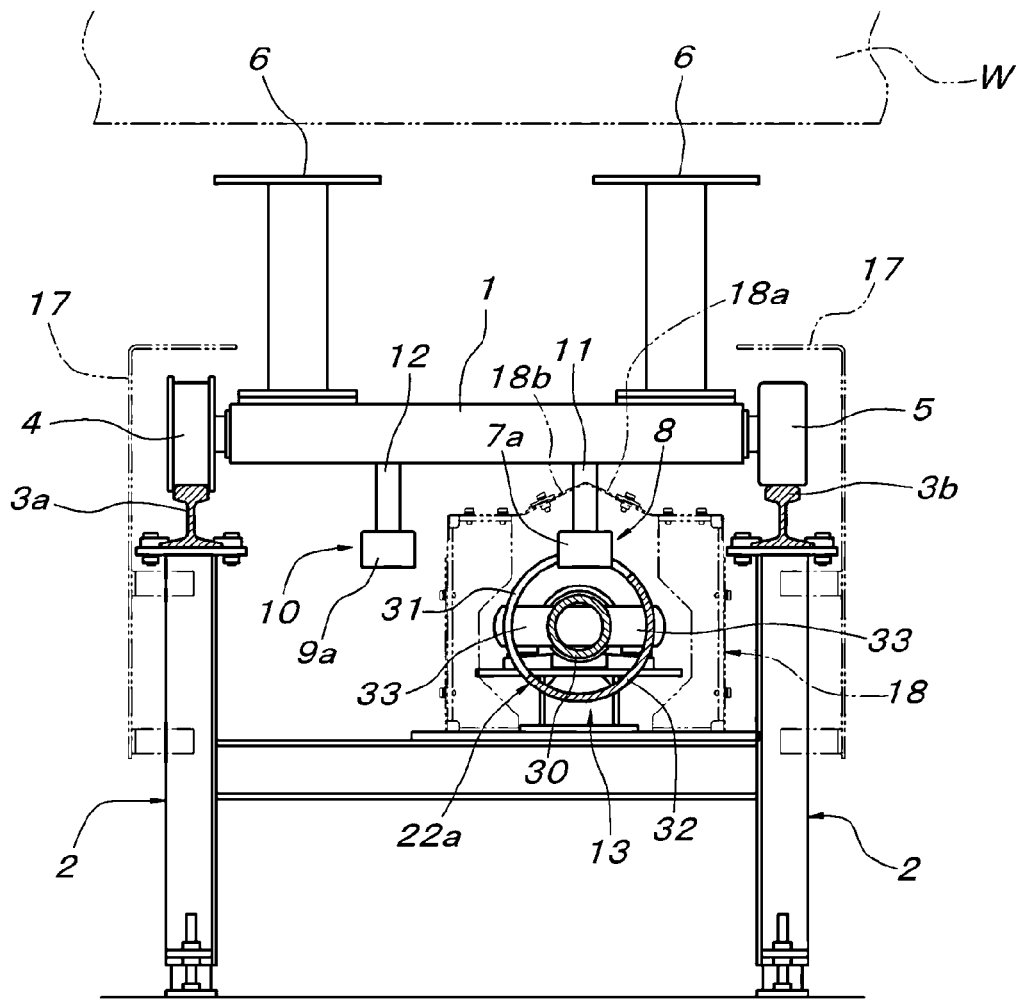
FIG. 3A is a front view of FIG. 1.
Figure 3B:
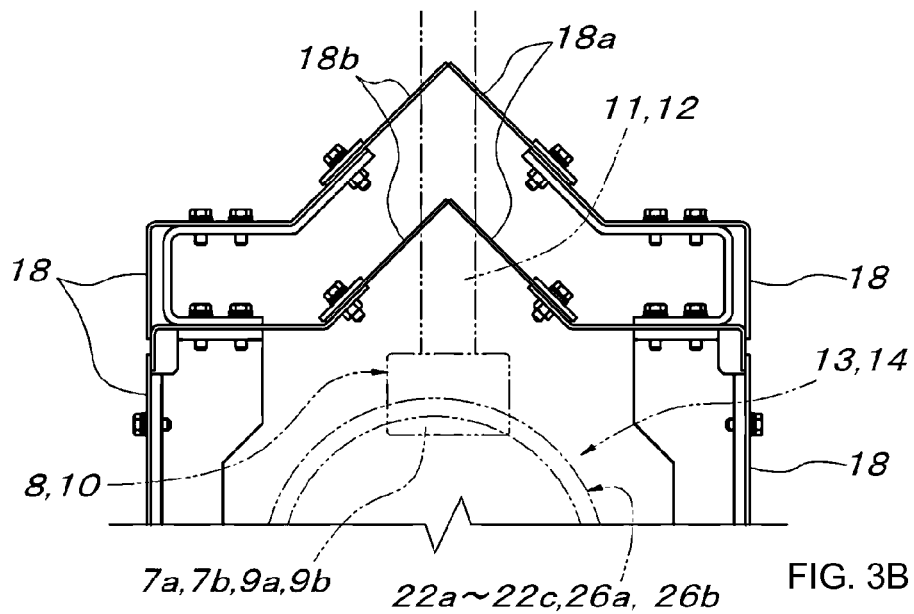
FIG. 3B is a front view of a main part showing a modification of part of FIG. 3A.

Each screw shaft 22a to 22c, 26a, 26b is formed such that a screw main body 32 in which a spiral slit 31 is formed at a circumferential wall of a steel pipe so as to continue across both ends is concentrically arranged outside a rotational center shaft 30 and this screw main body 32 and the rotational center shaft 30 are integrated by a connection plate 33 welded and fixed to the screw main body 32 with an inner end welded and fixed to the rotational center shaft 30 and an outer end side penetrating the screw main body 32 in a radial direction, as shown in FIG. 3A. To the rotational center shaft 30, the universal joints 19a, 19b, 23a, 23b, 28a, 28b of the transmission means 21, 25, 27 are connected. The driven roller 7a, 7b, 9a, 9b on the conveying traveling body 1 side is fitted inside the slit 31.

In the screw-drive conveying apparatus configured as above, the first and second screw shaft rows 13, 14 interlockingly connected to each other by the transmission means 27 are rotationally driven in a predetermined direction at a predetermined speed by a not-shown motor of a drive means, thereby allowing for the screw drive of each of the conveying traveling bodies 1 set at appropriate intervals in the traveling path provided with these respective screw shaft rows 13, 14.

That is, the conveying traveling body 1 in which the driven rollers 7a, 7b of the first driven roller pair 8 are engaged with the respective screw shaft 22a to 22c within the first screw shaft row 13 travels forward on the traveling path (the guide rails 3a, 3b) at the speed determined by the spiral pitch SSP, SP, LP of the spiral shaft 22a to 22c with which the driven rollers 7a, 7b are being engaged. When the conveying traveling body 1 passes through each screw discontinued space where the transmission means 21 is interposed within the first screw shaft row 13, the rear-side driven roller 7b can receive thrust from the upstream screw shaft 22a to 22c and continue the forward traveling after the headmost driven roller 7a departs from the upstream screw shaft 22a to 22c, and the headmost driven roller 7a can enter the screw shaft 22a to 22c on the downstream side at the same time when this rear-side driven roller 7b departs from the upstream screw shaft 22a to 22c, and the headmost driven roller 7a can subsequently receive thrust from the screw shaft 22a to 22c on the downstream side and travel forward continuously, since the length L1 of the screw discontinued space is equal to the distance D1 between the driven rollers 7a, 7b. In other words, the phases of the screw shafts 22a to 22c before and behind the transmission means 21 are matched such that the conveying traveling body 1 can receive thrust and travel forward continuously in this manner. Further, even if the spiral pitch of the screw shafts 22a to 22c before and behind the transmission means 21 differs, the two driven front and rear rollers 7a, 7b do not receive thrust simultaneously from these front and rear screw shafts 22a to 22c due to this configuration. Therefore, switching from the speed determined by the spiral pitch of the rear-side screw shaft 22a to 22c to the speed determined by the spiral pitch of the front-side screw shaft 22a to 22c can be made without any problem.

The conveying traveling body 1 in which the driven rollers 9a, 9b of the second driven roller pair 10 are engaged with the respective screw shaft 26a, 26b within the second screw shaft row 14 travels forward on the traveling path (the guide rails 3a, 3b) at the speed determined by the spiral pitch MP of the screw shaft 26a, 26b with which the driven rollers 9a, 9b are being engaged. In this embodiment, the second screw shaft row 14 is composed of the screw shafts 26a, 26b whose spiral pitches are the same, and thus, the conveying traveling body 1 travels forward at a constant speed within the area of the second screw shaft row 14. Further, when the conveying traveling body 1 passes through the screw discontinued space where the transmission means 25 is interposed within the second screw shaft row 14, the conveying traveling body 1 travels continuously without halting in the same manner as when passing through the screw discontinued space within the area of the first screw shaft row 13 due to that the length L2 of the screw discontinued space is equal to the distance D2 between the driven rollers 9a, 9b and the phases of the screw shafts 26a, 26b before and behind the transmission means 25 are matched.

Figure 6A:
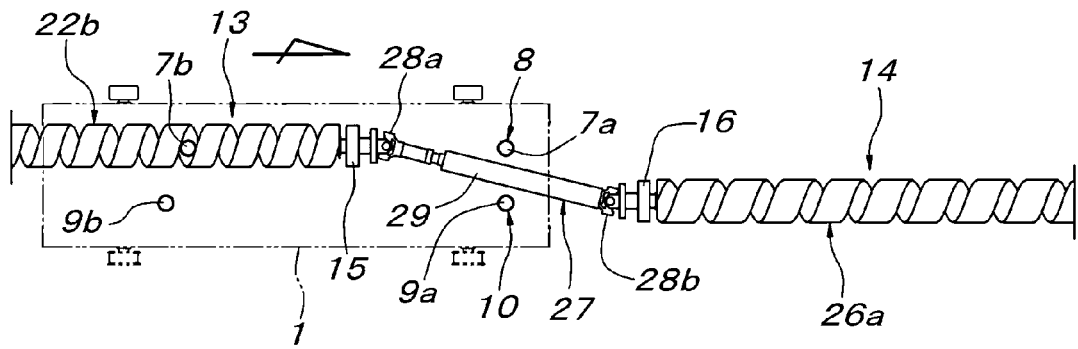
FIGS. 6A to 6C are schematic plan views explaining driving states of the conveying traveling body when transferring from the first screw shaft row to the second screw shaft row.
Figure 6B:
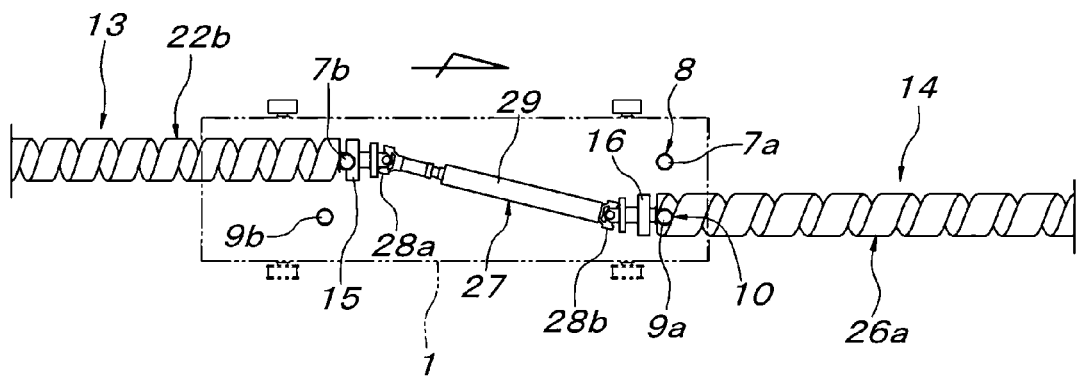
Figure 6C:
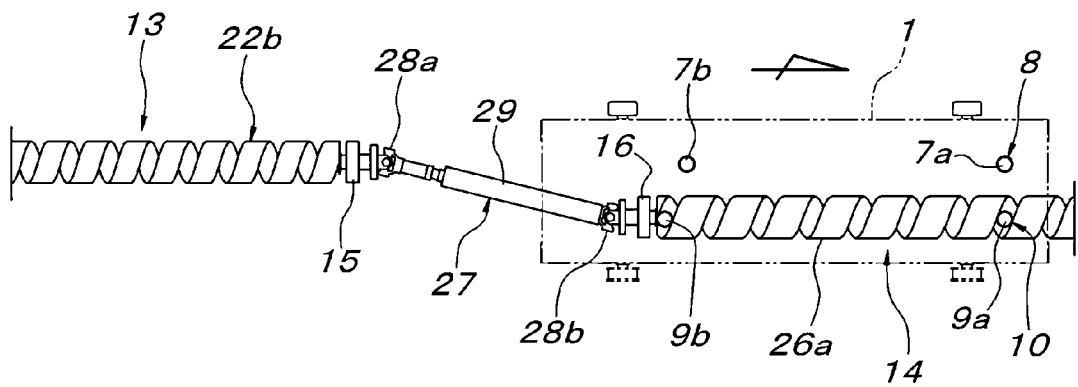

When the conveying traveling body 1 moves from the area of the first screw shaft row 13 to the area of the second screw shaft row 14, as shown in FIG. 6, the rear-side driven roller 7b can receive thrust from the upstream screw shaft (the screw shaft 22b in the shown example) and continue the forward traveling after the headmost driven roller 7a of the first driven roller pair 8 departs from the screw shaft of the upstream first screw shaft row 13 (the screw shaft 22b in the shown example), and the headmost driven roller 9a of the second screw shaft pair 10 can enter the screw shaft at the beginning end of the second screw shaft row 14 on the downstream side (the screw shaft 26a in the shown example) at the same time when the rear-side driven roller 7b departs from the upstream first screw shaft row 13, and the headmost driven roller 9a can subsequently receive thrust from the second screw shaft row 14 on the downstream side and travel forward continuously, since the screw discontinued space where the transmission means 27 between the upstream first screw shaft row 13 and the downstream second screw shaft row 14 is interposed is designed to have the length L1 equal to the distance D1 between the two driven front and rear rollers 7a, 7b of the first driven roller pair 8 and also the phases of the screw shaft at the terminal end of the first screw shaft row 13 on the upstream side of the transmission means 27 (the screw shaft 22b in FIG. 6) and the screw shaft of the second screw shaft row 14 on the downstream side (the screw shaft 26a in FIG. 6) are matched.

It is a matter of course that the rear-side driven roller 9b of the second driven roller pair 10 can enter the screw shaft of the second screw shaft row 14 (the screw shaft 26a in the shown example) without any problem since the screw shafts 26a, 26b of the second screw shaft row 14 are designed to have the spiral pitch MP being an integer fraction at the distance D2 between the two driven front and rear rollers 9a, 9b of the second driven roller pair 10. Further, by the foregoing configuration, the headmost driven roller 9a of the second driven roller pair 10 does not receive thrust from the screw shaft of the second screw shaft row 14 on the downstream side (the screw shaft 26a in the shown example) at the same time when the rear-side driven roller 7b of the first driven roller pair 8 receives thrust from the screw shaft of the first screw shaft row 13 on the upstream side (the screw shaft 22b in the shown example).

Figure 7A:
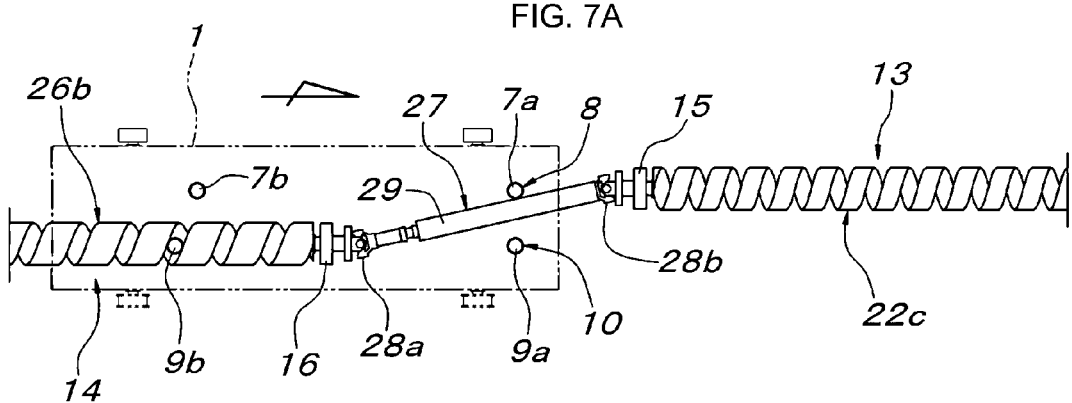
FIGS. 7A to 7C are schematic plan views explaining driving states of the conveying traveling body when transferring from the second screw shaft row to the first screw shaft row.
Figure 7B:
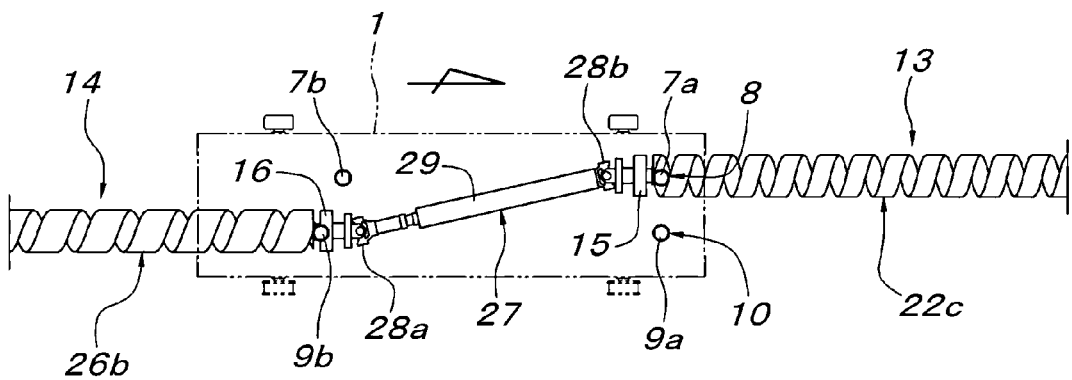
Figure 7C:
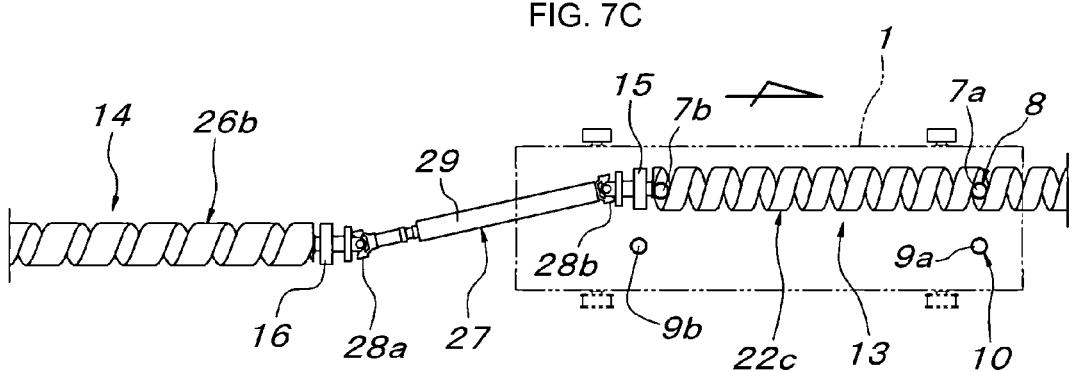

When the conveying traveling body 1 moves from the area of the second screw shaft row 14 to the area of the first screw shaft row 13, as shown in FIG. 7, the rear-side driven roller 9b can receive thrust from the upstream screw shaft 26b and continues the forward traveling after the headmost driven roller 9a of the second driven roller pair 10 departs from the screw shaft of the upstream second screw shaft row 14 (the screw shaft 26b in the shown example), and the headmost driven roller 7a of the first driven roller pair 8 can enter the screw shaft at the beginning end of the first screw shaft row 13 on the downstream side (the screw shaft 22c in the shown example) at the same time when the rear-side driven roller 9b departs from the upstream second screw shaft row 14, and the headmost driven roller 7a can subsequently receive thrust from the first screw shaft row 13 on the downstream side and travel forward continuously, since the screw discontinued space where the transmission means 27 between the upstream second screw shaft row 14 and the downstream first screw shaft row 13 is interposed is designed to have the length L2 equal to the distance D2 between the two driven front and rear rollers 9a, 9b of the second driven roller pair 10 and also the phases of the screw shaft at the terminal end of the second screw shaft row 14 on the upstream side of the transmission means 27 (the screw shaft 26b in the shown example) and the screw shaft at the beginning end of the first screw shaft row 13 on the downstream side (the screw shaft 22c in the shown example) are matched.

In this case as well, the rear-side driven roller 7b of the first driven roller pair 8 can enter the screw shaft of the first screw shaft row 13 (the screw shaft 22c in the shown example) without any problem, since the screw shaft 22a to 22c of the first screw shaft row 13 is designed to have the spiral pitch LP, SP, SSP being an integer fraction at the distance D1 between the two driven front and rear rollers 7a, 7b of the first driven roller pair 8. Further, by the foregoing configuration, the headmost driven roller 7a of the first driven roller pair 8 does not receive thrust from the screw shaft of the first screw shaft row 13 on the downstream side (the screw shaft 22c in the shown example) at the same time when the rear-side driven roller 9b of the second driven roller pair 10 receives thrust from the screw shaft of the second screw shaft row 14 on the upstream side (the screw shaft 26b in the shown example).

Figure 8A:
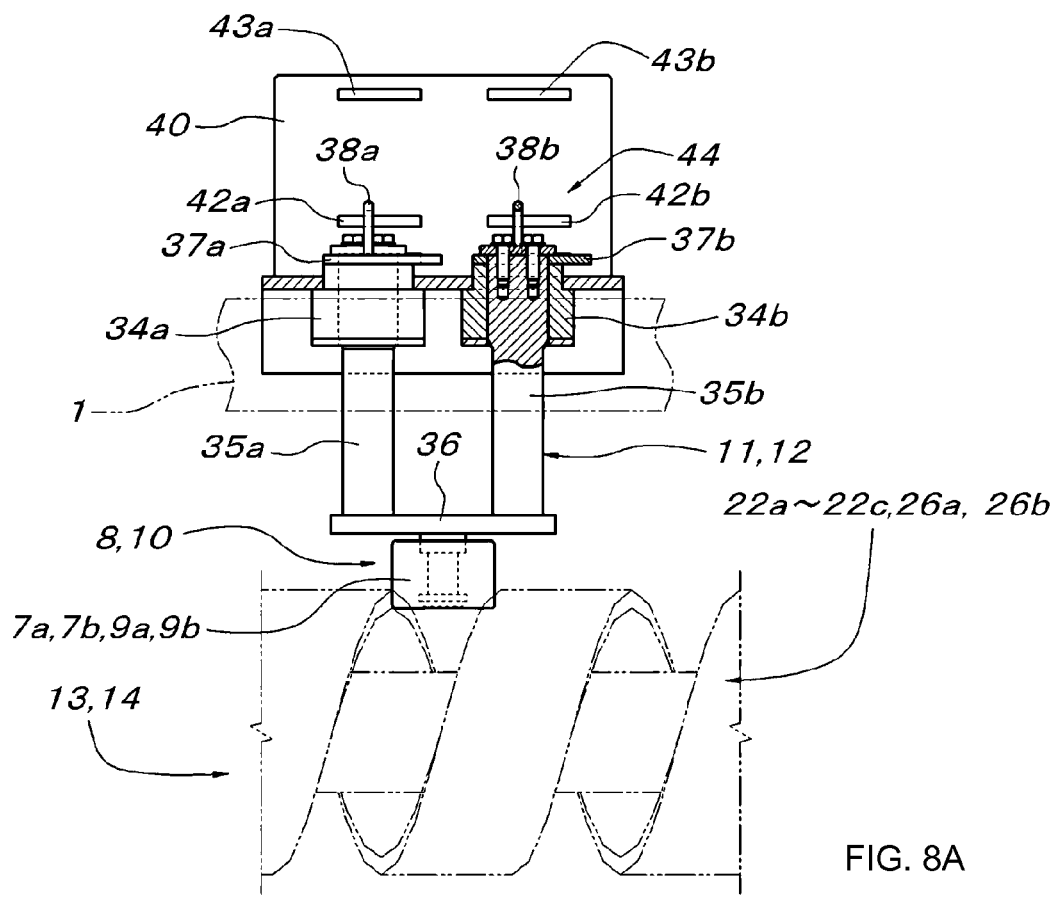
FIG. 8A is a partial longitudinal sectional side view showing a support structure of the driven roller.

The support structure of each driven roller 7a, 7b, 9a, 9b should not be limited in particular. One example of a preferred support structure will be described based on FIG. 8 and FIG. 9. The vertical shaft body 11, 12 having the lower end pivotally supporting the driven roller is composed of a front and a rear movable shaft body 35a, 35b vertically movably supported to the conveying traveling body 1 by elevation guides 34a, 34b, and a movable body 36 fixed to lower ends of the movable shaft bodies 35a, 35b and integrating both movable shaft bodies 35a, 35b. The driven roller is pivotally supported at an intermediate position between both movable shaft bodies 35a, 35b below the movable body 36 so as to be rotatable about the vertical support shaft. The front and the rear movable shaft body 35a, 35b are arranged in parallel, appropriately spaced in the traveling direction of the conveying traveling body 1, that is, the axial direction of the screw shaft row 13, 14. Upper ends of these movable shaft bodies 35a, 35b protruded on the upper side of the conveying traveling body 1 are provided with rotary tables 37a, 37b rotatable about the movable shaft bodies 35a, 35b. On the rotary tables 37a, 37b, portal handles 38a, 38b whose horizontal shaft rod portions can be gripped by hand are respectively projected. Engaging portions 39a, 39b jutting out in the range of substantially 180 degrees are formed around the respective rotary tables 37a, 37b in the same phase with respect to the portal handles 38a, 38b.

Figure 8B:
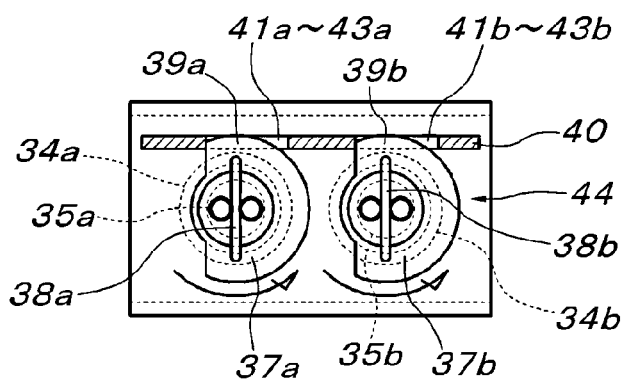
FIG. 8B is a cross sectional plan view showing a locking state of a locking means in the same support structure.

On the other hand, a vertical fixed plate 40 is erected at a lateral side of the pair of front and rear rotary tables 37a, 37b. Correspondingly to the respective rotary tables 37a, 37b, three vertical stages of engaged portions 41a, 41b, 42a, 42b, and 43a, 43b are provided to this vertical fixed plate 40. These engaged portions 41a to 43b are each composed of a horizontal slit into which the engaging portion 39a, 39b of the rotary table 37a, 37b is horizontally fitted by rotation of the rotary table 37a, 37b. As shown in FIG. 8B, when both rotary tables 37a, 37b are rotated in the same direction while positioned at a height of engaged portions at the same height of the engaged portions 41a to 43b, the respective engaging portions 39a, 39b of the rotary tables 37a, 37b are horizontally fitted to corresponding engaged portions 41a to 43b. One ends of the engaging portions 39a, 39b abut against one ends of the engaged portions 41a to 43b, and the rotation of the respective rotary tables 37a, 37b is restrained.

Figure 8C:
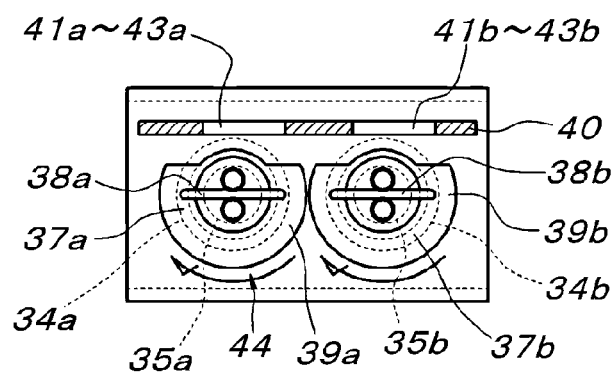
FIG. 8C is a cross sectional plan view showing an unlocking state of the locking means in the same support structure.

In the foregoing configuration, as shown in FIG. 8B, both movable shaft bodies 35a, 35 having the respective rotary tables 37a, 37b at the upper ends are locked at a height corresponding to the height of the engaged portions 41a to 43b to which the engaging portions 39a, 39b of both rotary tables 37a, 37b are fitted, by respectively fitting the engaging portions 39a, 39b of both rotary tables 37a, 37b to the engaged portions at the same height of the engaged portions 41a to 43b. As shown in FIG. 8C, both rotary tables 37a, 37b are reversely rotated via the portal handles 38a, 38b, and the engaging portions 39a, 39b of the rotary tables 37a, 37b are disengaged from the engaged portions 41a to 43b, thereby releasing the lock to both movable shaft bodies 35a, 35b. Therefore, both movable shaft bodies 35a, 35b can be raised and lowered directly by hand via the portal handles 38a, 38b and the rotary tables 37, 37b.

Figures 9A, 9B, 9C:
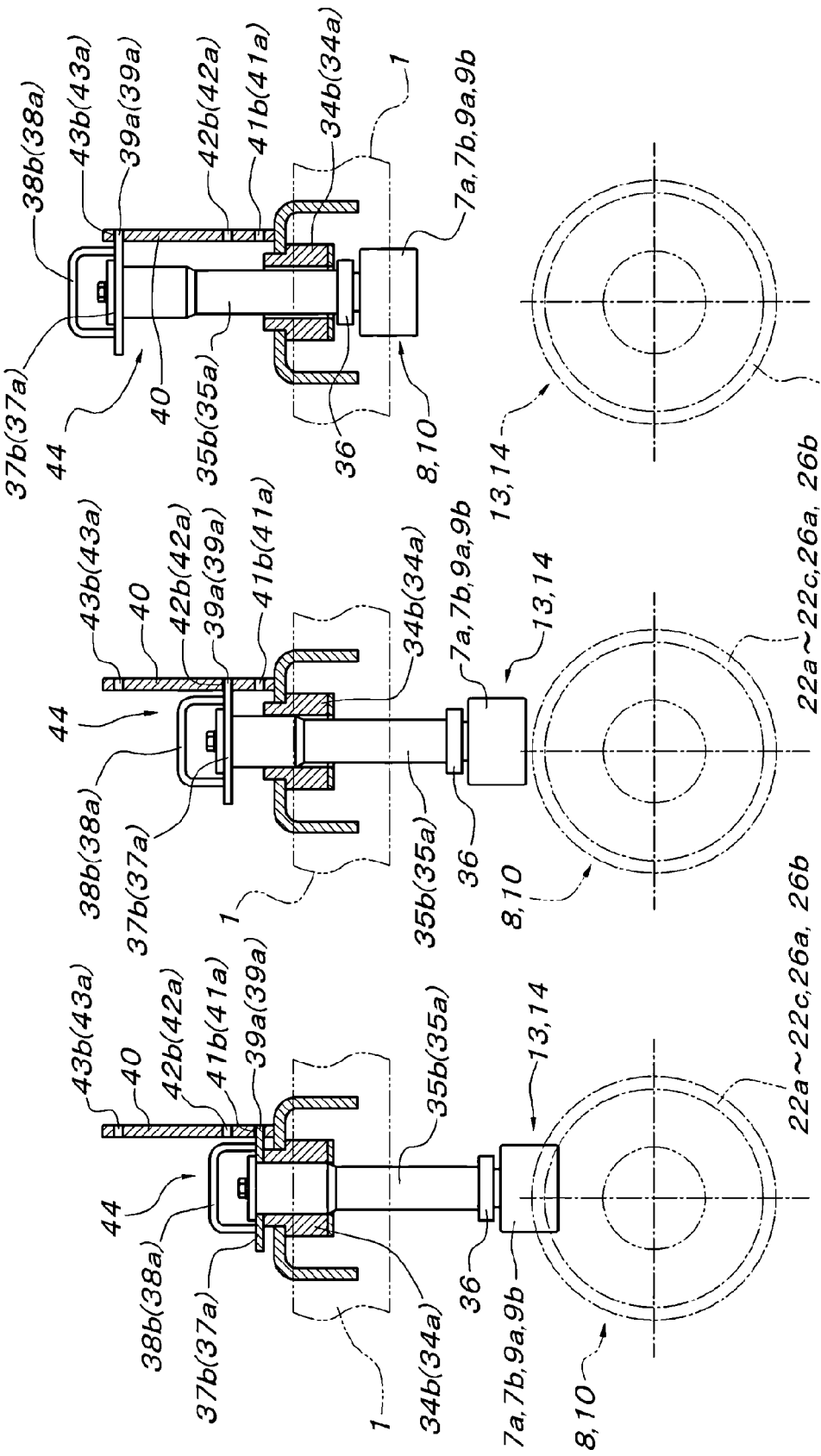
FIGS. 9A to 9C are partial longitudinal sectional front views showing switching states of the support height of the driven roller.

Accordingly, in this embodiment, a locking means 44 to lock the height of the driven roller 7a, 7b, 9a, 9b at a predetermined height is composed of the engaging portions 39a, 39b of both rotary tables 37a, 37b and the three vertical stages of engaged portions 41a, 41b, 42a, 42b, and 43a, 43b of the vertical fixed plate 40. As shown in FIG. 9A, the driven roller 7a, 7b, 9a, 9b is positioned in an active position of being engaged with the screw shaft 22a to 22c, 26a, 26b when the engaging portions 39a, 39b of both rotary tables 37a, 37b are fitted to the engaged portions 41a, 41b at the lowest stage. As shown in FIG. 9B, the driven roller 7a, 7b, 9a, 9b is positioned in an inactive position of being disengaged upward from the screw shaft 22a to 22c, 26a, 26b when the engaging portions 39a, 39b of both rotary tables 37a, 37b are fitted to the engaged portions 42a, 42b at the middle stage. As shown in FIG. 9C, the driven roller 7a, 7b, 9a, 9b is disengaged upward from the screw shaft 22a to 22c, 26a, 26b and is positioned in a storage position of being withdrawn within the conveying traveling body 1 when the engaging portions 39a, 39b of both rotary tables 37a, 37b are fitted to the engaged portions 43a, 43b at the upper stage.

The screw-drive conveying apparatus of the present invention can be utilized as a conveying means capable of conveying a workpiece (such as an automobile vehicle body) by changing the conveying speed at every area in a continuous conveyance line in an automobile assembly line, etc.

What is claimed is:

1. A screw-drive conveying apparatus in which a screw shaft row composed of a plurality of screw shafts concentrically arranged in a line and interlockingly rotating at a constant speed with respect to each other is provided along a traveling path of a conveying traveling body, and two driven front and rear rollers engaged with the screw shafts are provided to the conveying traveling body with a distance corresponding to a length of a screw discontinued space between the screw shafts, characterized in that as the two driven front and rear rollers, at least two pairs of a first driven roller pair having a shorter distance between the two driven front and rear rollers and a second driven roller pair having a longer distance between the two driven front and rear rollers are provided, displaced in a direction orthogonal to a traveling direction of the conveying traveling body, and as the screw shaft row, a first screw shaft row with which the respective driven rollers of the first driven roller pair are engaged and a second screw shaft row with which the respective driven rollers of the second driven roller pair are engaged are provided alternately along the traveling path of the conveying traveling body, and respective screw shafts of the first screw shaft row and respective screw shafts of the second screw shaft row are interlockingly connected at a constant speed with respect to each other, and a length of screw discontinued spaces between the first and second screw shaft rows in the traveling direction of the conveying traveling body is equal to the distance in the traveling direction of the conveying traveling body between a headmost driven roller of the driven roller pair engaged with the screw shaft row on a downstream side of the traveling path and a rear-side driven roller of the driven roller pair engaged with the screw shaft row on an upstream side of the traveling path.

2. The screw-drive conveying apparatus according to claim 1, wherein at least one of the first and second screw shaft rows is incorporated with a plurality of different feeding speed screw shafts having a spiral pitch set in a condition of becoming an integer fraction at the distance between the two driven front and rear rollers engaged with this screw shaft row.

3. The screw-drive conveying apparatus according to claim 1, wherein the first and second screw shaft rows are arranged bilaterally symmetrically with respect to a middle position in a width direction of the conveying traveling body within a space below the conveying traveling body.

4. The screw-drive conveying apparatus according to claim 1, wherein a screw shaft at an end portion of the first screw shaft row and a screw shaft at an end portion of the second screw shaft row are interlockingly connected to each other by a transmission means composed of universal joints and an obliquely arranged transmission shaft.

5. The screw-drive conveying apparatus according to claim 1, wherein a headmost driven roller of the first driven roller pair and a headmost driven roller of the second driven roller pair are arranged in parallel in the direction orthogonal to the traveling direction of the conveying traveling body.

6. The screw-drive conveying apparatus according to claim 1, wherein each driven roller is pivotally supported to a movable body supported to the conveying traveling body by two movable shaft bodies arranged in a line in the traveling direction of the conveying traveling body and being capable of reciprocating perpendicularly to the engaging screw shaft, and a locking means to lock the two movable shaft bodies in an active position that the driven roller is engaged with the screw shaft and in an inactive position that the driven roller is disengaged from the screw shaft is provided.

7. The screw-drive conveying apparatus according to claim 6, wherein the locking means comprises rotary tables respectively supported to end portions of the movable shaft bodies so as to be rotatable about the movable shaft bodies, handles for rotationally operating the rotary tables, a fixed plate arranged on the conveying traveling body side so as to adjoin the rotary tables and provided with engaged portions, and engaging portions provided around the rotary tables, and the engaging portions are configured to be engaged and disengaged with respect to the engaged portions by rotation of the rotary tables when the driven roller is in the active position and the inactive position.

* * * * *